United States Patent Office 2,881,220
Patented Apr. 7, 1959

2,881,220

PRODUCTION OF DIMETHYL PHENYL CARBINOL

William D. Griffin, Morris Township, Morris County, and Zalik Oser, Morristown, N.J., assignors to Allied Chemical Corporation, New York, N.Y., a corporation of Delaware No Drawing. Application November 14, 1956
Serial No. 622,016

11 Claims. (Cl. 260—618)

This invention relates to production of a dimethyl aryl carbinol from isopropylbenzene or a $C_1$–$C_3$ alkyl-substituted isopropylbenzene oxidation reaction mixture containing the alpha-hydroperoxide formed from the isopropyl group, i.e. a phenyl or $C_1$–$C_3$ alkylphenyl dimethyl methine hydroperoxide of general formula $$ArC(CH_3)_2O_2H$$

where Ar is phenyl or $C_1$–$C_3$ alkylphenyl.

When mono-isopropylbenzene, i.e cumene, is the oxidized hydrocarbon the hydroperoxide in the starting oxidation mixture is cumene hydroperoxide and the carbinol formed therefrom is dimethyl phenyl carbinol.

Dimethyl phenyl carbinol is of interest as such and as an intermediate for production of alpha methylstyrene. Mixtures of dimethyl phenyl carbinol and cumene hydroperoxide can be reacted to produce para-alpha-cumyl phenol. $C_1$–$C_3$ alkyl-substituted phenyl dimethyl carbinols behave similarly. Accordingly, efficient processes for production of dimethyl phenyl carbinol and the like, as such or in mixtures with the corresponding hydroperoxides, have been sought in the art.

The present process has the advantage, over various previously known processes, of operating directly upon a crude oxidation reaction mixture containing hydroperoxide and of producing practically exclusively the dimethyl aryl carbinol as the hydroperoxide decomposition product, with only very small amounts of acetophenone or substituted acetophenone by-product.

Our process comprises maintaining specifically tripotassium phosphate in solid form in contact with an aryl dimethyl methine hydroperoxide wherein the aryl radical is a member of the group consisting of phenyl and $C_1$–$C_3$ alkylphenyl, at least until substantial quantities of the corresponding dimethyl aryl carbinol have been produced. Suitably the hydroperoxide is diluted, e.g. by a reaction medium consisting essentially of the hydrocarbon and the carbinal corresponding to the starting hydroperoxide; and reaction temperatures are between about 50° C. and about the normal atmospheric boiling point of the reaction mixture. In one specific embodiment of our process starting from cumene hydroperoxide, the reaction conditions are maintained until the content of dimethyl phenyl carbinol present in the reaction mixture reaches at least about 10% by weight, with the content of cumene hydroperoxide reaching at least about 10% by weight. The resulting reaction mixtures can be fractionated for recovery of carbinol or after simple filtration of tripotassium phosphate, can be used for production of para-alpha-cumyl phenol.

The detailed description that follows refers specifically to production of dimethyl phenyl carbinol but is generally applicable to the production of other carbinols by our process, from the corresponding hydroperoxides. For example our process can be used to produce para-methyl-; para-ethyl-; para-n-propyl-; and para-isopropylphenyl dimethyl carbinols from the corresponding dimethyl methine hydroperoxides.

The time required for appearance of substantial quantities of carbinol in our reaction mixtures will vary with reaction conditions including temperature; but since the carbinol is a stable product in our reaction mixtures, it is produced under a wide range of conditions. To assure satisfactory reaction rates and optimum yields when using a starting material such as crude cumene hydroperoxide from cumene oxidation, we prefer to operate at temperatures in the range from about 80° C. to about 120° C and with tripotassium phosphate concentrations in the range between about 1% and about 25% by weight of the reaction mixture, and with the cumene amounting to at least about 50% of the final product by weight. Suitable crude cumene oxidation products are those containing a major proportion by weight of cumene; at least about 15% by weight of cumyl-alpha-hydroperoxide; permissibly dimethyl phenyl carbinol; and not more than about 5% by weight of other reaction products.

Tripotassium phosphate is unique in its effectiveness in our process as compared to closely related compounds such as trisodium phosphate, which has little or no activity for hydroperoxide decomposition to carbinol.

We have found that when the cumene hydroperoxide concentration of a cumene oxidation reaction mixture falls to the range of about 10–15% by weight, the net rate of the decomposition reaction under our conditions becomes comparatively slow, and that the decomposition apparently stops at not below about 5% by weight cumene hydroperoxide concentration. Accordingly, if it is desired to produce further quantities of dimethyl phenyl carbinol from the cumene hydroperoxide remaining in the reaction mixture after these concentrations have been reached, a catalyst such as specifically manganese dioxide can be used in the reaction mixture with or without prior filtration to remove tripotassium phosphate. Operation using such a catalyst upon these solutions of relatively low cumene hydroperoxide content results in low production of acetophenone therefrom at suitable temperatures, which are about 60° C. when using manganese dioxide. The cumene hydroperoxide concentration can readily be reduced by this means to below 5% by weight. Other catalysts which can be used similarly to manganese dioxide include potassium hydroxide, sodium hydroxide, and lead dioxide, and others which have greater activity ratio than does tripotassium phosphate for decomposition of cumene hydroperoxide to dimethyl phenyl carbinol:oxidation of cumene.

The examples which follow are illustrative of our invention but are not to be interpreted as limiting the invention to all details of the examples.

*Example 1.*—A cumene oxidation reaction mixture, produced by air oxidation of cumene and containing about 25% by weight of cumene hydroperoxide with no more than 5% by weight of other reaction products was passed by continuous feed and overflow through two stirred reaction vessels. The first vessel was operated at a temperature of 100° C. and hold up time of 4.5 hours. It was supplied with solid tripotassium phosphate powder in amount to maintain suspended therein 10 grams of tripotassium phosphate for each 100 milliliters of reaction mixture. The product obtained from this reaction vessel contained about 14% by weight dimethyl phenyl carbinol, 13% by weight of cumene hydroperoxide, 2% by weight of di-alpha-cumyl peroxide, and 0.7% by weight of acetophenone with the balance essentially all cumene.

This reaction product was filtered and passed into the second reaction vessel, which was operated at 60° C. with 2.5 hours hold up time. Solid manganese dioxide powder was supplied to this second reaction vessel in amounts to maintain 10 grams of manganese dioxide for each 100 milliliters of reaction mixture suspended in the second vessel. The product thus obtained analyzed 26% by weight dimethyl phenyl carbinol, 3.5% by weight cumene hydroperoxide, 1.8% by weight acetophenone, and the balance essentially all cumene.

A repeat run on a larger scale using cumene oxidation product containing 24.7% by weight cumene hydroperoxide gave a first product analyzing in weight percent 13.9% dimethyl phenyl carbinol, 13.8% cumene hydroperoxide, 3.7% dicumyl peroxide and 0.5% acetophenone. By distillation of the product from the second decomposition there was recovered in weight percent 24.9% dimethyl phenyl carbinol, 6.8% dicumyl peroxide, 3.1% cumene hydroperoxide, 1.8% acetophenone, and the balance essentially all cumene.

The tripotassium phosphate removed by filtration from the first step of the decomposition can readily be treated to allow its use indefinitely in the process, e.g. by boiling with a solvent such as acetone or cumene followed by drying.

When a diisopropylbenzene oxidation product, containing as major oxidized product para-diisopropylbenzene-alpha-hydroperoxide, was substituted for the cumene oxidation product using otherwise essentially the conditions of this example, para-isopropylphenyl dimethyl carbinol was formed as the principal reaction product.

*Example II.*—A meta-diisopropylbenzene oxidation reaction mixture containing the corresponding mono-alpha-hydroperoxide as the most abundant oxidation product therein, and containing considerable amounts of meta-isopropyl phenyl dimethyl carbinol and some 1,3-di-alpha-hydroperoxy diisopropylbenzene (dihydroperoxide of the meta-diisopropyl benzene) was extracted with aqueous caustic to remove dihydroperoxide; analysis of the product then showed it to be of the composition shown in the table below. This product was added slowly to a small pool of meta-diisopropylbenzene in which 10% (gms./100 ml.) tripotassium phosphate was suspended with agitation; the temperature was kept at 120°–130° C., and the catalyst concentration was kept at about 10% by adding it in increments as additional product was introduced. The decomposition reaction mixture was filtered, and infrared analysis then showed the composition shown in the table.

TABLE

*Compositions in weight percent*

| Oxidation product | Component | Decomposition product |
|---|---|---|
| 49 | m-diisopropylbenzene monohydroperoxide | 10 |
| 31 | Dimethyl-m-isopropylphenyl carbinol | 67 |
| 5 | m-Isopropylacetophenone | 14 |
|  | Balance essentially m-diisopropylbenzene. |  |

*Example III.*—A cumene oxidation product, like that of Example I and containing 27.2% cumene hydroperoxide, was maintained at 100° C. in contact with air. There was added with stirring 5 grams of solid tripotassium phosphate powder for each 100 milliliters of oxidation product. The temperature of the reaction mixture increased to 120° C. and then slowly fell back to 100° C. The cumene hydroperoxide concentration dropped to 14% after one hour; 4 hours later it was still 13.3%. This 5-hour sample analyzed 25.3% by weight carbinol and 1.4% by weight acetophenone, and the balance essentially all cumene. This indicates that carbinol and/or cumene hydroperoxide was formed from cumene present in the original cumene oxidation product by contact of said cumene with the elemental oxygen of air.

We claim:
1. Process for production of a dimethyl aryl carbinol which comprises maintaining solid tripotassium phosphate in contact with an aryl dimethyl methine hydroperoxide wherein the aryl radical is a member of the group consisting of phenyl and $C_1$–$C_3$ alkylphenyl, at least until substantial quantities of dimethyl phenyl carbinol reaction product have been produced; reaction temperature being in the range between about 50° C. and the atmospheric pressure boiling point of the reaction mixture and concentration of said hydroperoxide contacted with said phosphate reaching at least about 10% by weight of the reaction mixture.

2. Process as defined in claim 1 wherein the hydroperoxide is chiefly the mono-alpha-hydroperoxide of meta-diisopropylbenzene.

3. Process as defined in claim 1 wherein the hydroperoxide is chiefly the mono-alpha-hydroperoxide of para-diisopropylbenzene.

4. Process as defined in claim 1 wherein the hydroperoxide is cumyl-alpha-hydroperoxide and is diluted by cumene.

5. Process as defined in claim 4 wherein the reaction mixture is in contact with elemental oxygen during at least part of the reaction period.

6. Process as defined in claim 5 wherein the hydroperoxide is diluted by a reaction medium consisting essentially of cumene and dimethyl phenyl carbinol; the reaction temperature is in the range between about 50° C. and the atmospheric pressure boiling point of the reaction mixture; and said conditions are maintained at least until the content of dimethyl phenyl carbinol in the reaction mixture is not less than about 10% by weight, with the content of hydroperoxide reaching at least about 10% by weight.

7. Process as defined in claim 6 wherein the starting material is a crude cumene oxidation product containing a major proportion by weight of cumene; at least about 15% by weight of cumyl-alpha-hydroperoxide; and not more than about 5% by weight of other reaction products; the tripotassium phosphate is maintained suspended in the reaction mixture in amounts in the range between about 1% and about 25% by weight of the reaction mixture; temperatures in said reaction mixture are in the range between about 80° C. and about 120° C.; and contact with the tripotassium phosphate is terminated when at least about 50% by weight of cumene remains present in the reaction mixture.

8. Process as defined in claim 6 wherein the cumyl-alpha-hydroperoxide concentration is reduced below about 10% by weight with formation of further quantities of dimethyl phenyl carbinol by contacting the aforesaid reaction mixture containing at least 10% by weight carbinol and at least 10% by weight hydroperoxide with solid manganese dioxide.

9. Process for production of dimethyl phenyl carbinol which comprises contacting a mixture of at least about 10% by weight of cumyl-alpha-hydroperoxide and a major proportion by weight of cumene with solid tripotassium phosphate at a reaction temperature in the range between about 50° C. and the atmospheric pressure boiling point of the reaction mixture, at least until the content of dimethyl phenyl carbinol in the reaction mixture is about 10% by weight.

10. Process as defined in claim 9 wherein contact with the tripotassium phosphate is terminated when the cumene hydroperoxide concentration of the reaction mixture is in the range between about 10% by weight and about 15% by weight; the resulting solution is filtered; and the hydroperoxide in the filtrate is decomposed to produce further quantities of dimethyl phenyl carbinol.

11. Process as defined in claim 10 wherein manganese dioxide is used as catalyst of the further decomposition treatment, the temperature used therefor is about 60° C., and the decomposition in presence of manganese dioxide is continued until the cumene hydroperoxide concentration is below 5% by weight.

References Cited in the file of this patent

UNITED STATES PATENTS

| | | |
|---|---|---|
| 2,484,841 | Lorand | Oct. 18, 1949 |
| 2,491,926 | Lorand et al. | Dec. 20, 1949 |
| 2,557,968 | Hulse et al. | June 26, 1951 |